(12) United States Patent
Olsson

(10) Patent No.: US 10,931,901 B2
(45) Date of Patent: Feb. 23, 2021

(54) METHOD AND APPARATUS FOR SELECTIVELY CORRECTING FIXED PATTERN NOISE BASED ON PIXEL DIFFERENCE VALUES OF INFRARED IMAGES

(71) Applicant: FLIR Systems AB, Täby (SE)

(72) Inventor: Stefan Olsson, Stockholm (SE)

(73) Assignee: FLIR SYSTEMS AB, Täby (SE)

( * ) Notice: Subject to any disclaimer, the term of this patent is extended or adjusted under 35 U.S.C. 154(b) by 11 days.

(21) Appl. No.: 15/690,904

(22) Filed: Aug. 30, 2017

(65) Prior Publication Data

US 2018/0063454 A1    Mar. 1, 2018

Related U.S. Application Data

(60) Provisional application No. 62/382,167, filed on Aug. 31, 2016.

(51) Int. Cl.
*H04N 5/365* (2011.01)
*H04N 5/33* (2006.01)
*H04N 5/14* (2006.01)

(52) U.S. Cl.
CPC ........... *H04N 5/3651* (2013.01); *H04N 5/145* (2013.01); *H04N 5/33* (2013.01); *H04N 5/332* (2013.01); *H04N 5/3658* (2013.01)

(58) Field of Classification Search
CPC .... H04N 5/365; H04N 5/3651; H04N 5/3658; H04N 5/2176; G06T 5/50
See application file for complete search history.

(56) References Cited

U.S. PATENT DOCUMENTS

| | | | | |
|---|---|---|---|---|
| 5,721,427 A | * | 2/1998 | White | H04N 5/3656 250/252.1 |
| 9,036,940 B1 | * | 5/2015 | Mundhenk | G06T 5/002 382/275 |
| 2011/0169960 A1 | * | 7/2011 | Wagner | H04N 5/145 348/162 |
| 2012/0113299 A1 | * | 5/2012 | Palik | G06T 5/50 348/241 |
| 2013/0147966 A1 | | 6/2013 | Kostrzewa et al. | |
| 2013/0321674 A1 | * | 12/2013 | Cote | H04N 9/64 348/242 |
| 2014/0016879 A1 | | 1/2014 | Hogasten et al. | |

(Continued)

*Primary Examiner* — Jayanti K Patel
*Assistant Examiner* — Christopher Kingsbury Glover
(74) *Attorney, Agent, or Firm* — Haynes and Boone, LLP

(57) ABSTRACT

A method and a thermal imaging device for correcting fixed pattern noise of in a video sequence of thermal images captured using a thermal imaging system are provided. The method includes receiving a sequence of thermal images captured using a thermal imaging system. The method also includes calculating a thermal image average of a plurality of the received thermal images and calculating pixel difference values between a received thermal image and the thermal image average. The method evaluates the pixel difference values in relation to an updating condition and calculates fixed pattern noise correction terms for the pixel difference values for which the updating condition is fulfilled. The method also includes correcting pixel values of a subsequently received thermal image with the fixed pattern noise correction terms to generate a sequence of thermal images having corrected fixed pattern noise.

19 Claims, 7 Drawing Sheets

(56) References Cited

U.S. PATENT DOCUMENTS

| | | |
|---|---|---|
| 2014/0092257 A1 | 4/2014 | Hogasten et al. |
| 2014/0253735 A1* | 9/2014 | Fox ..................... H04N 5/2252 348/164 |
| 2017/0163919 A1* | 6/2017 | Kawai ...................... G01J 1/42 |

* cited by examiner

7011 IR image pixel value$_{3,2}$

710 IR image$_{T1}$

2611 IR image pixel value$_{1,7}$

261 IR image$_{T2}$ 731 temporal IR image average pixel value$_{3,2}$ 730 temporal IR image average$_{T3}$

METHOD AND APPARATUS FOR SELECTIVELY CORRECTING FIXED PATTERN NOISE BASED ON PIXEL DIFFERENCE VALUES OF INFRARED IMAGES

CROSS-REFERENCE TO RELATED APPLICATION

This application claims the benefit of and priority to U.S. Provisional Patent Application No. 62/382,167 filed Aug. 31, 2016 and entitled "METHOD AND APPARATUS FOR CORRECTING FIXED PATTERN NOISE OF AN INFRARED IMAGE," which is incorporated herein by reference in its entirety.

TECHNICAL FIELD

The present disclosure relates generally to thermal imaging techniques, and more particularly to correcting fixed pattern noise in thermal imaging.

BACKGROUND

Within the area of imaging, for example with video or still images, images may suffer from deficiencies, for example being noisy, having low contrast or having low brightness. Such deficiencies may make it difficult to identify objects in the images, thus requiring processing to improve their quality. Two main noise contributions are temporal noise and noise related to optical path and detector pixel or element dependent noise, typically referred to as fixed pattern noise (FPN). More or less all digital image sensors, in particular in thermal imaging, such as infrared (IR) imaging, suffer from fixed pattern noise (FPN). The FPN is mainly due to the fact that individual detector elements or pixels in the image sensor have individual responses, i.e. respond slightly different when subjected to the same amount of thermal radiation. The FPN remains almost constant from frame to frame, with a small drift over time. With conventional techniques, the FPN is usually corrected in a process that may be referred to as non-uniformity correction (NUC) or as flat field correction. Such conventional techniques require a shutter closure for calibration and correction, causing a video image freezing and generally adding complexity to imaging systems.

SUMMARY

The present disclosure in accordance with one or more embodiments is directed to solving or at least to minimizing the problems mentioned above. This is achieved by a method, a thermal imaging device, a computer program product or software according to the claims, for correcting fixed pattern noise, herein in short also called FPN.

In some embodiments, pixel value differences between a temporal IR-image-average and a captured IR image is calculated and used to update a fixed pattern correction image comprising FPN terms.

One or more embodiments of the present disclosure solve this by calculating pixel difference values in an adaptive temporal IR image filter, evaluating the pixel difference values in relation to an updating condition and calculating fixed pattern noise correction terms for the pixel difference values for which the updating condition is fulfilled. The fixed pattern noise correction terms are then used to correct pixel values of a subsequently received thermal image to generate a sequence of thermal images having corrected fixed pattern noise.

In some embodiments, the fixed pattern noise correction terms are stored or represented in an image data structure herein called an FPN correction image. The FPN correction image is updated with the calculated fixed pattern noise correction terms if the updating condition is evaluated as fulfilled. The updated FPN correction image is then used to correct subsequent IR images captured in the video sequence.

An advantage of the present disclosure is that FPN correction can be performed without a calibration shutter. Yet another advantage is that FPN is corrected for a broad range of the spatial noise frequency spectra. Yet another advantage is that FPN can be corrected even when no relevant initial FPN correction image is available. Yet another advantage is that computational complexity is reduced.

In one or more embodiments there is provided a method for correcting fixed pattern noise of in a video sequence of thermal images captured using a thermal imaging system, the method comprising: receiving a sequence of thermal images captured using a thermal imaging system; calculating a thermal image average of a plurality of the received thermal images; calculating pixel difference values between a received thermal image and the thermal image average; evaluating the pixel difference values in relation to an updating condition; calculating fixed pattern noise correction terms for the pixel difference values for which the updating condition is fulfilled; and correcting pixel values of a subsequently received thermal image with the fixed pattern noise correction terms to generate a sequence of thermal images having corrected fixed pattern noise.

In some embodiments, a set of fixed pattern noise correction terms are recalculated and updated to an increased or a decreased value dependent on the updating condition.

The effect is that fixed pattern noise is removed in all frequencies, and is for example independent of any occurring irregularities of the thermal image detector with regard to fixed pattern noise.

In one or more embodiments, the pixel difference values are calculated as the difference between pixels of a set of pixels of the received thermal image and pixels of a corresponding set of pixels of the thermal image average.

In one or more embodiments, the thermal image average is calculated as one or more of a temporal image average and/or a spatial image average. In some embodiments where the thermal image average is calculated as both a temporal image average and a spatial image average, the effect is that the thermal image average is displaced in the image space and the calculations of pixel difference values are performed on the same pixel indices. In other embodiments the pixel indices are recalculated such that calculations of pixel difference values are performed on corresponding sets of pixels.

In one or more embodiments, the evaluation of the pixel difference values in relation to the updating condition comprises determining whether the pixel difference values are below a predetermined pixel difference value threshold. In some embodiments, pixel difference weights are calculated for this purpose. The pixel difference weight is a normalized form of a pixel difference value in the range 0 to 1 and a pixel difference value threshold is set within this range. So, for example, if the pixel difference values are large, e.g. one order of magnitude larger than fixed pattern noise, no corrections are made.

In one or more embodiments, the evaluation of the pixel difference values in relation to the updating condition further comprises determining whether there is an overlap between the current received image and a previously stored image. In such embodiments, the method may further comprise generating a registered thermal image and a register difference (REG Diff) based on a thermal image in the video sequence or the temporal IR image average. An overlap may then be determined based on the register difference (REG Diff). The previously stored image may for example be a previous image of the video sequence or a temporal thermal image average.

In one or more embodiments, the evaluation of the pixel difference values in relation to the updating condition further comprises determining whether there is motion between the current received image and a previous image of the video sequence. Determining the occurrence of motion may be performed by calculating a motion measure based on the register difference. Motion between the images may be due to movement in the imaged scene or due to movement of the camera.

The evaluation of the pixel difference values in relation to the updating condition may further comprise determining whether the motion measure is greater than a predetermined motion threshold. In some embodiments, there are further ways to calculate motion, control or create motion, for example with the aid of external sensors, using the images, controlling the camera in a certain way or path. For example, in larger thermal imaging systems the PAN tilt function may be controlled to move, in smaller thermal imaging systems the detector or a lens may be controlled to move.

In one or more embodiments, the evaluation of the pixel difference values in relation to the updating condition comprises determining one or more of the sign (e.g., positive or negative) of the respective pixel difference values and/or the magnitude of the respective pixel difference values.

In one or more embodiments, the temporal thermal image average is motion compensated. This is useful in some embodiments where the spatial alignment is used to simplify calculations.

In one or more embodiments, the method further comprises correcting temporal noise in said IR image after said fixed pattern noise correction. This increases the efficiency in noise reduction.

In one or more embodiments there is provided a non-transitory machine-readable medium on which is stored machine-readable code which, when executed by a processor of a thermal imaging device, causes the processor to perform any of the methods described above.

In one or more embodiments there is provided a thermal imaging device for correcting fixed pattern noise in a video sequence of thermal images, comprising: a thermal imaging system; a memory; and a processor; wherein the processor is configured to: receive a sequence of thermal images captured by thermal imaging system; calculate a thermal-image-average of a plurality of the received thermal images; calculate pixel difference values between a received thermal image and the thermal image average; evaluate the pixel difference values, in relation to an updating condition; calculate fixed pattern noise correction terms for the pixel difference values for which the updating condition is fulfilled; and correcting pixel values of a subsequently received thermal image with the fixed pattern noise correction terms to generate a sequence of thermal images having corrected fixed pattern noise.

In one or more embodiments, the pixel difference values are calculated between pixels of a set of pixels of the received thermal image and pixels of a corresponding set of pixels of the thermal image average.

In one or more embodiments, the thermal image average is calculated as one or more of a temporal and/or spatial image average.

In one or more embodiments, the evaluation of the pixel difference values in relation to the updating condition comprises determining whether the pixel difference values are below a predetermined pixel difference value threshold.

In one or more embodiments, the evaluation of the pixel difference values in relation to the updating condition further comprises determining whether there is an overlap between the current received image and a previously stored image.

In one or more embodiments, the evaluation of the pixel difference values in relation to the updating condition comprises determining whether there is motion between the current received image and a previous image of the video sequence.

In one or more embodiments, the evaluation of the pixel difference values in relation to the updating condition comprises determining one or more of the sign of the respective pixel difference values and/or the magnitude of the respective pixel difference values.

In one or more embodiments, the temporal thermal image average is motion compensated.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Introduction

The disclosure in accordance with one or more embodiments relates to a method and a thermal imaging device 170 configured for correcting fixed pattern noise (FPN). The thermal imaging device is further configured for capturing thermal images of a scene in a video sequence. Thermal images may herein also be called IR images. The thermal imaging device is further configured to capture a signal frame or data frame of IR image data values, or pixel values, representing a captured IR image. IR image data values, or pixel values, typically include data values for example represented in an instance of a data structure, such as an image data frame. The IR image data values, or pixel values, may also comprise or include a visual representation such as an RGB value of the pixel value, thermal imaging device parameters, calibration parameters, time information, date information or any other data related or relevant to the capture of the IR image.

System Embodiments

Figure 1:
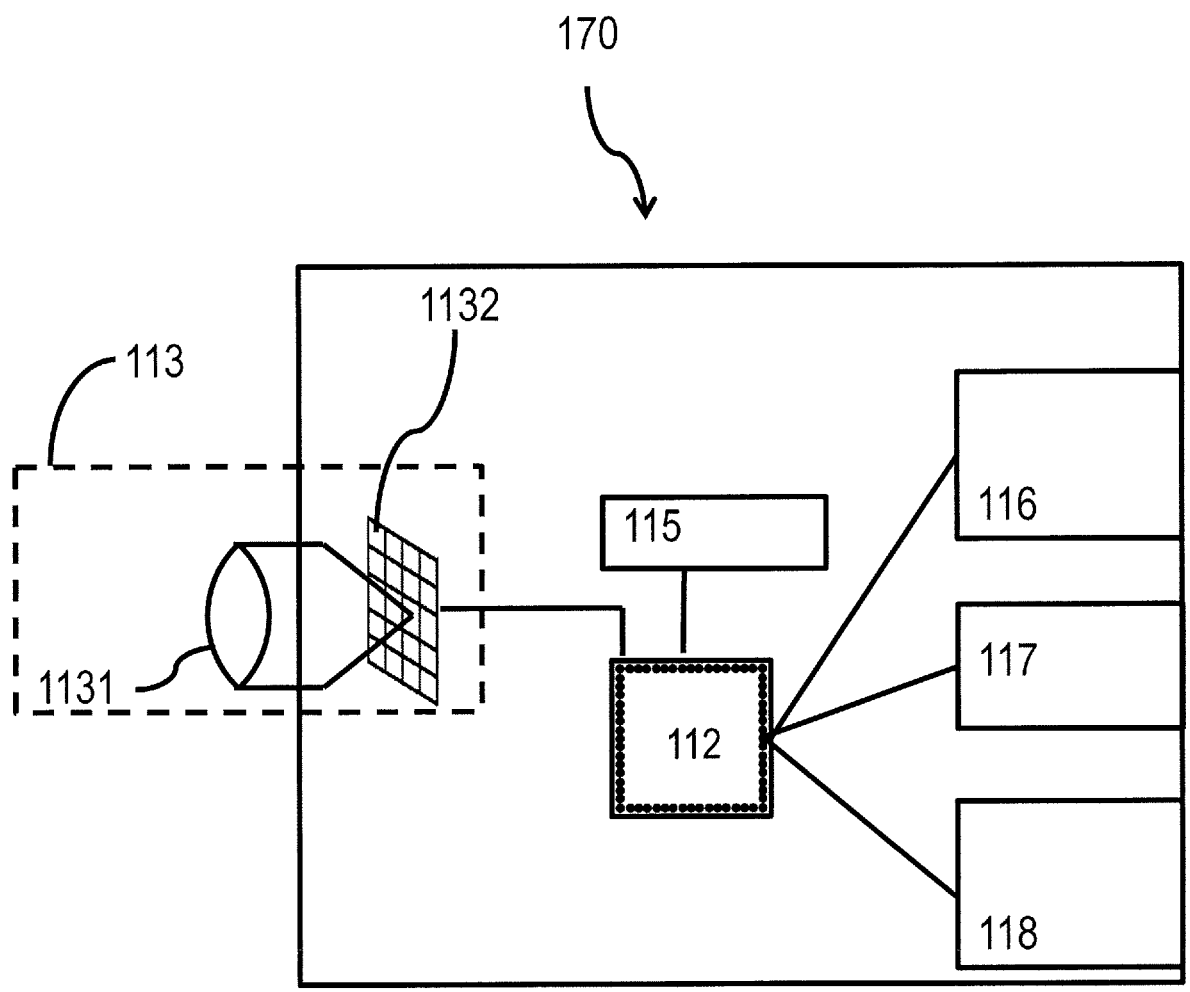
FIG. 1 shows a schematic view of a thermal imaging device, according to one or more embodiments presented herein.

FIG. 1 shows a schematic view of a thermal imaging device 170 according to one or more embodiments presented herein, which may e.g. be in the form of a thermography arrangement or an infrared IR camera. In some embodiments, the thermal imaging device 170 comprises an infrared (IR) imaging system 113 that is configured to capture infrared (IR) images in the form of IR image data values, or pixel values, representing infrared radiation emitted from a scene. In some embodiments, the thermal imaging device 170 further comprises a processor/processing unit 112 provided with specifically designed programming or program code portions adapted to control the processing unit to perform the steps and functions of any or all of the method embodiments described herein. The infrared (IR) imaging system 113 may be communicatively coupled to the processor 112. In some embodiments, the infrared (IR) imaging system 113 is further arranged to receive control data from the processor 112, and in response to said control data trigger capturing of an infrared image of the scene. In some embodiments, the infrared (IR) imaging system 113 is further arranged to send a signal frame of IR image data values, in the form of a captured IR image, to the processor 112. In some embodiments, the thermal imaging device 170 further comprises at least one memory 115 configured to store program code portions, data values and/or parameters received from the processor 112, and/or to retrieve and send program code portions, data values and/or parameters to the processor 112. In some embodiments, the thermal imaging device 170 further comprises a communications interface 116, whereby the thermal imaging device is configured to send or receive data values and/or parameters to/from the processor 112 and/or external or internal units or sensors via the communications interface 116. In one or more embodiments, the thermal imaging device 170 further comprises one or more input devices 117 configured to receive input or indications from a user, e.g. being generated by a user to indicate capture of IR images in a video sequence.

In one or more embodiments, the thermal imaging device 170 further comprises a display 118, configured to receive a signal from the processor 112 and further configured to display the received signal as a displayed image, e.g. to display a visual representation of an IR image or visual representation of IR image frames of an entire received video sequence to a user of the thermal imaging device 170. In one embodiment, the display 118 is integrated with one or more user input devices 117 configured to receive a signal from the processor 112 and to display the received signal as a displayed image and receive input or indications from a user, e.g. by applying touch screen functionality and to send a user input signal to the processor 112. In some embodiments, the processor 112 is communicatively coupled to the infrared (IR) imaging system 113, the memory 115, the communications interface 116, and optionally the user input device 117 and/or the display 118.

In one example, the infrared (IR) imaging system 113 includes an optical system 1131, e.g. comprising a lens, zoom functionality and focus functionality, together with a corresponding infrared (IR) detector 1132, e.g. comprising a micro-bolometer focal plane array, a Quantum Well Infrared Photodetector (QWIP), thermocouples, thermopiles, Golay cells or pyroelectric detectors.

In one or more embodiments, an infrared (IR) image comprises a frame of IR image data values that represent infrared radiation emitted or reflected from a scene. In one example, IR image data values, or pixel values, are represented in an instance of a data structure, such as an image data frame. In one example, the scene, also referred to herein as the observed scene, includes a part of the observable world, e.g. a part of an industrial complex being inspected with a thermal imaging device.

In one or more embodiments, the memory 115 is configured to maintain a fixed pattern noise correction terms for example in a data structure representing an FPN correction image, as would be understood by a skilled person. In one example the FPN correction image includes flat field correction terms, such as a gain/scaling factor and/or an offset that is applied to individual pixels of a captured IR image to correct the IR image for FPN. Application of the FPN correction image to a captured IR image may comprise adjusting each individual pixel value in the captured IR image by adding the offset to or subtracting the offset from the pixel value and/or by multiplying or dividing the pixel value of the pixel with the gain/scaling factor.

In yet another embodiment, the memory 115 is configured to maintain a thermal image average for example in a data structure representing a temporal IR image average, as would be understood by a skilled person. In one embodiment the temporal IR image average has the same dimensions, rows and columns, as the captured IR images and comprises IR image pixel average values derived from pixels in a captured video sequence substantially or in practical circumstances representing the same object, or scene subset, in the observed scene. In yet another embodiment, the temporal IR image average is calculated by a temporal filter. In yet another embodiment, the temporal IR image average is calculated using an infinite impulse response (IIR) filter.

Figure 2:
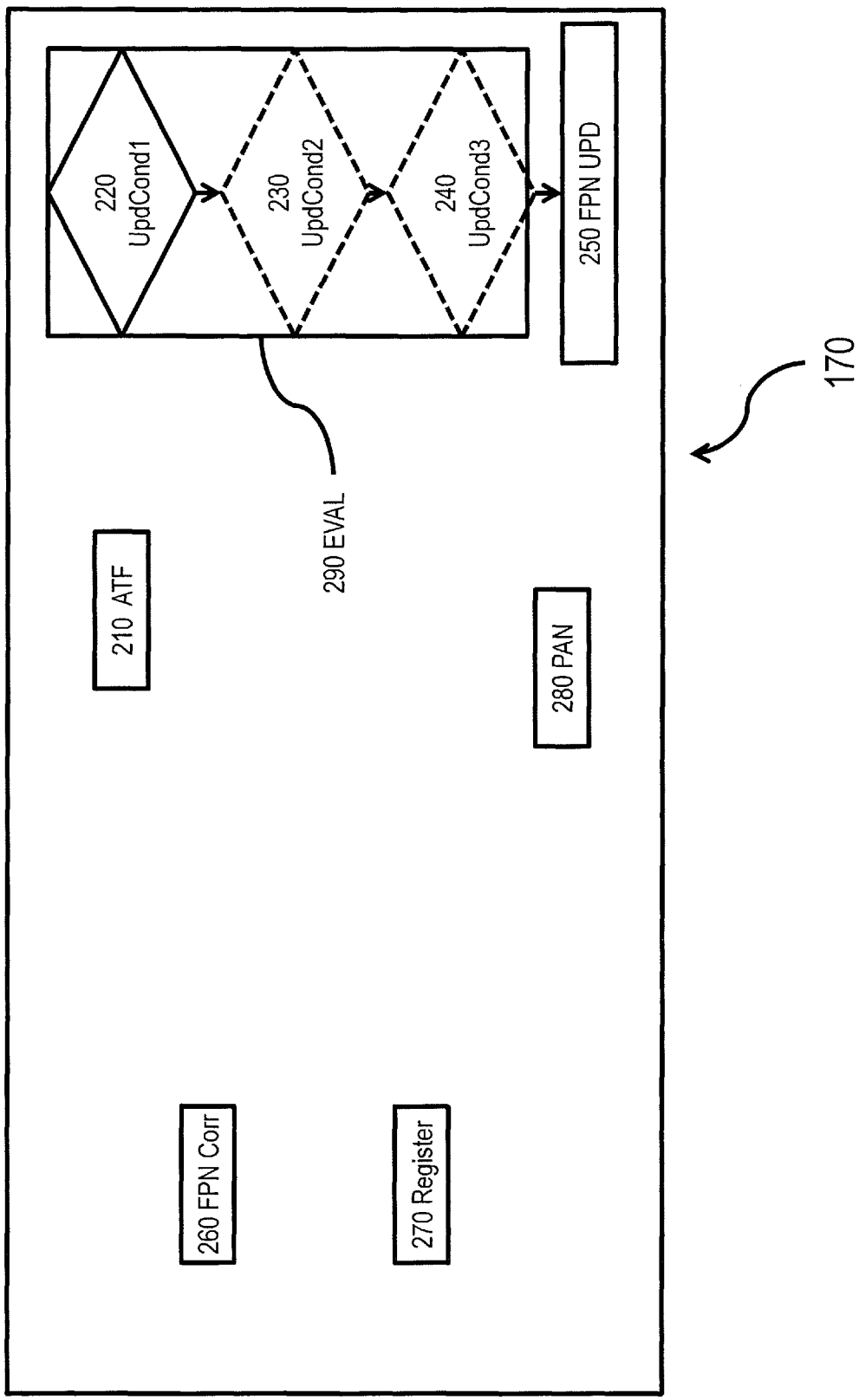
FIG. 2 shows a thermal imaging device comprising functional blocks, according to one or more embodiments presented herein.

FIG. 2 shows schematically one or more embodiments of the thermal imaging device 170 of the present disclosure comprising functional blocks represented in the form of computer code. In one or more embodiments, the thermal imaging device 170 comprises an FPN correction functional block 260 (also labeled "FPN Corr 260"), a Register functional block 270 (also labeled "REG 270"), an Adaptive Temporal Filtering functional block 210 (also labeled "ATF 210"), an updating condition evaluator functional block 290 (also labeled "EVAL 290"), and a fixed pattern noise correction image updater functional block 250 (also labeled "FPN UPD 250"). In some embodiments, the processor 112 is provided with code portions adapted to control the processor 112 to perform functions of embodiments of the disclosure described herein in functional blocks, wherein each functional block performs different basic functions e.g. correcting FPN of an IR image (FPN Corr 260), registering a captured IR image to a reference image (REG 270), such as a previous IR image in the video sequence or to the temporal IR image average, temporal filtering of the IR image (ATF 210), or evaluating pixel difference values in relation to an updating condition (EVAL 290), for example a first updating condition 220, a second updating condition 230 and/or a third updating condition 240. Together the functional blocks provide basic functions that result in correcting fixed pattern noise of an infrared (IR) image in a video sequence.

The functional blocks may be configured to correct fixed pattern noise of an infrared (IR) image 261 in a video sequence. The fixed pattern noise correction may be based on pixel difference values 211.

In some embodiments, correction of fixed pattern noise of an infrared (IR) image 261 in a video sequence is further based on a motion measure and/or an overlap measure.

In one or more embodiments, the thermal imaging device 170 of the present disclosure further comprises a PAN-tilt functional block 280 (also labeled "PAN 280").

Figure 3:
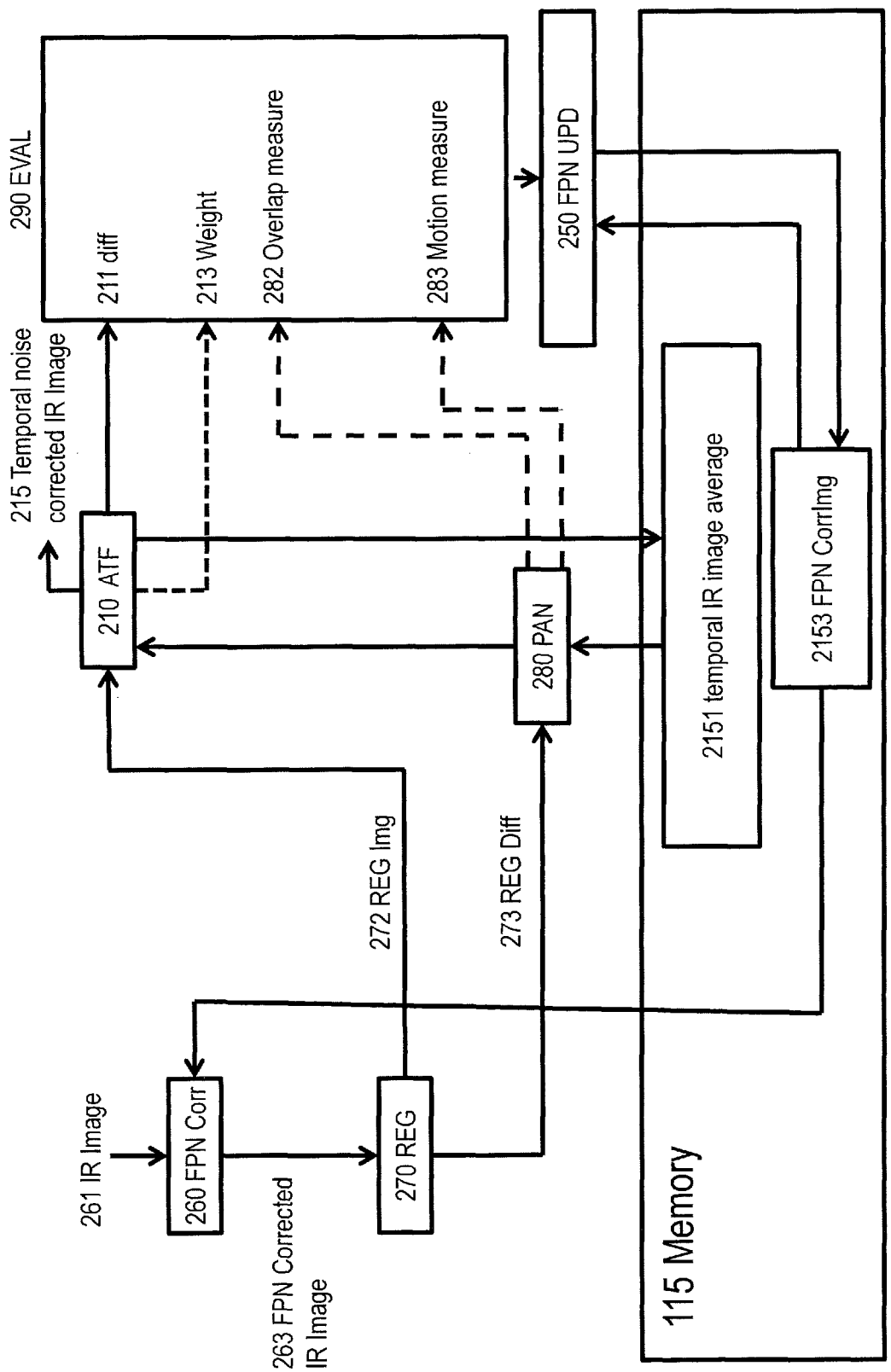
FIG. 3 shows a block diagram of a thermal imaging device for correcting fixed pattern noise FPN of an infrared (IR) image, according to one or more embodiments presented herein.

FIG. 3 shows a block diagram of a thermal imaging device 170 for correcting fixed pattern noise FPN of an infrared (IR) image, according to one or more embodiments presented herein. The thermal imaging device 170 may comprise a processor configured to:

receive a sequence of thermal images captured by thermal imaging system;

calculate a thermal-image-average of a plurality of the received thermal images;

calculate, e.g. using an Adaptive Temporal Filtering functional block ATF 210, pixel difference values between a received thermal image and the thermal image average;

evaluate, e.g. using an updating condition evaluator functional block EVAL 290, the pixel difference values in relation to an updating condition;

calculate, e.g. using a fixed pattern noise correction image updater functional block FPN UPD 250, fixed pattern noise correction terms for the pixel difference values for which the updating condition is fulfilled; and correct, e.g. using a FPN correction functional block FPN Corr 260, pixel values of a subsequently received thermal image with the fixed pattern noise correction terms to generate a sequence of thermal images having corrected fixed pattern noise.

To determine whether an updating condition is fulfilled may for example comprise evaluating the pixel difference values in relation to the updating condition. This may e.g. comprise determining that a subset of the pixel difference values are below a predetermined pixel difference value threshold.

In one or more embodiments, the method may further comprise: obtaining, by a FPN correction functional block FPN Corr 260, the IR image, having a first field of view depicting a scene; and obtaining, by a PAN-tilt functional block RAN 280, a temporal IR-image-average.

In some embodiments, the temporal IR-image-average may have a second field of view depicting substantially the same scene.

In some embodiments, the method may further comprise evaluating an updating condition to determine whether there is an overlap between a current image and a previously received and/or stored image. This may for example be performed by determining, by the PAN 280, an overlap measure based on a register difference 273 (also labeled "REG Diff 273").

In some embodiments, the evaluation of the updating condition may further comprise determining whether the overlap measure exceeds a predetermined overlap threshold.

In some embodiments, the overlap measure may be determined for each pixel value of a registered IR image 272 (also labeled "REG Img 272").

In some embodiments, the method may further comprise determining, by the PAN 280, a motion measure based on the register difference REG Diff 273, wherein the updating condition further comprises determining that the motion measure is greater than a predetermined motion threshold.

In some embodiments, the method may further comprise: receiving, by the FPN UPD 250, pixel difference values 211, for which the updating condition is successfully evaluated, and corresponding pixel coordinates; updating, by the FPN UPD 250, the FPN correction image 2153 based on the received pixel difference values 211 and corresponding pixel coordinates; and generating, by register functional block REG 270, a registered IR image REG Img 272 and a register difference REG Diff 273 based on the captured IR image 261, a previous IR image in the video sequence or the temporal IR image average.

In one or more embodiments, the method further may comprise: generating, by the ATF 210, a temporal noise corrected IR image 215; calculating, by the ATF 210, pixel difference values 211; and calculating and saving to memory 115, by the ATF 210, an updated temporal IR image average 2151.

In one or more embodiments, the fixed pattern noise correction image may have a third field of view depicting substantially or in practical circumstances the same observed scene. In an embodiment the third field of view is the same as the second field of view of a temporal IR image average.

Functional Block FPN Corr

Fixed pattern noise (FPN) relates to nearly temporally constant lateral non-uniformity, or constant pattern noise, in an imaging system with multiple detector or sensor elements/pixels. FPN arises from small differences in the individual responsivity of the elements/pixels that might be caused by variations in the pixel size, material, or interference with the local circuitry. In addition, FPN might be affected by changes in the surrounding environment like thermal addition caused by the optical path, varying ambient temperatures, exposure times, etc. FPN is usually defined in terms of a detector element, or pixel, offset. The offset is sometimes referred to as DSNU (dark signal non-uniformity), and the element, or pixel, gain, is sometimes referred to as the PRNU (photo response non-uniformity), describing the gain between infrared radiation power subjected to an element/pixel versus the generated electrical signal output. FPN does not change significantly across a limited series of consecutively captured IR images in a video sequence, however it will change over a longer period of time. In some embodiments of the present disclosure, FPN is corrected in an IR image by applying an FPN correction image. The correction terms, such as offset, comprised in the FPN correction image are then updated, when it is evaluated that an updating condition is fulfilled, e.g. that pixel difference values are below a pixel difference value threshold or threshold value. The terms "threshold value" and "threshold" are used interchangeably in this disclosure.

In some embodiments, the functional blocks comprise an FPN correction functional block FPN Corr 260, wherein the FPN Corr 260 is configured to correct FPN of an infrared (IR) image based on the FPN correction image. In some embodiments, correcting FPN further comprises: obtaining an IR image (e.g., IR image 261), wherein the IR image has a first field of view depicting an observed scene; obtaining a fixed pattern noise correction image (e.g., FPN correction image 2153); and correcting fixed pattern noise of the infrared (IR) image based on the fixed pattern noise correction image.

In a non-limiting example, the IR image having a dimension of N rows and M columns is captured by the IR imaging system 113 of the thermal imaging device 170. A fixed pattern noise correction image, also having a dimension of N pixel rows and M pixel columns and comprising offset values for each pixel of the IR image, is obtained. The corrected pixel value of the FPN correction image may be calculated as:

$$\text{FPN corrected pixel value}_{row\ x, column\ y, T_{n+1}} = \text{IR image pixel value}_{row\ x, column\ y, T_{n+1}} + \text{fixed pattern noise correction image}_{row\ x, column\ y, T_n} \quad \text{(equation 0)}.$$

In some embodiments, the dimensions of the FPN correction image 2153 are the same as the dimensions of the IR image 261.

Functional Block REG

In some embodiments, the functional blocks comprise a Register functional block REG 270. In some embodiments, the REG 270 may be configured to generate a registered IR image REG Img 272 and register difference REG Diff 273 based on a reference image, such as a previous IR image in the video sequence, by registering or aligning the captured IR image 261 to the reference image. In one example, this comprises registering an IR image captured at time T2 to an IR image captured at time T1 by determining parallax error values such as horizontal displacement, vertical displacement and rotation around the optical axis. In one or more embodiments, generating a registered IR image REG Img 272 may comprise shifting, rotating and optionally cropping and/or zero filling the captured IR image 261 such that, after shifting, rotating and cropping of the IR image 261, each pixel with the same pixel coordinate in the reference image represent the same part/object in the observed scene.

In one or more embodiments, generating REG Diff 273 may comprise generating a selection of parallax error values such as horizontal displacement, vertical displacement and rotation around the optical axis and a Parallax Transform relation. In one or more embodiments, generating a registered IR image REG Img 272 may comprise merging or associating data representing the captured IR image 261, data representing REG Diff 273 and a Parallax Transform relation as the registered IR image REG Img 272. Generating REG Diff 273 my further comprise generating a selection of parallax error values such as horizontal displacement, vertical displacement and rotation around the optical axis.

In one non-limiting example, a specific imaged object in the observed scene is represented by a single pixel with a pixel coordinate of (10,10) in the captured IR image captured at time or temporal index $T_n$ in the video sequence. The same specific object is represented by a single pixel with a pixel coordinate of (5,8) in the previously captured IR image captured at temporal index $T_{n-1}$ in the video sequence. Parallax error values may then be determined as horizontal displacement (10−5=5) and vertical displacement (10−8=2). Optionally, rotation around the optical axis of 0 degrees may be determined.

Functional Block ATF

In some embodiments, the functional blocks comprise an Adaptive Temporal Filtering ATF 210 functional block. In one or more embodiments, the ATF 210 may be configured to generate a temporal noise corrected IR image 215, to calculate pixel difference values 211, and to calculate and save to memory an updated temporal IR image average 2151. In one or more embodiments, the ATF 210 may further be configured to generate pixel difference weights 213, wherein the pixel difference weights 213 are a normalized form of the pixel difference values 211 in the range of [0-1].

In some embodiments, Adaptive Temporal Filtering ATF 210 is configured to generate a temporal noise corrected IR image 215.

In some embodiments, the temporal noise corrected IR image 215 may be generated as:

$$\text{temporal noise corrected IR image pixel value}_{row\ x, column\ y, T_{n+1}} = \alpha * \text{temporal IR image average}_{row\ x, column\ y, T_n} + (1-\alpha) * \text{REG Img}_{row\ x, column\ y, T_{n+1}}$$
$$\Rightarrow \alpha * \text{temporal IR image average}_{row\ x, column\ y, T_n} + \text{REG Img}_{row\ x, column\ y, T_{n+1}} - \alpha * \text{REG Img}_{row\ x, column\ y, T_{n+1}} \quad \text{(equation 1)},$$

where (row x, column y) denotes a pair of pixel coordinates in an image, e.g. the temporal noise corrected IR image 215, $T_{index}$ denotes the temporal index of the image in the video sequence, and α denotes a weighting factor in the range [0-1].

In some embodiments, REG Img 272 comprises merged or associated data. A temporal noise corrected IR image can be generated based on the registered IR image REG Img 272 and the temporal IR image average 2151, e.g. by transforming the coordinates of the IR image to the corresponding coordinates of the IR image average.

In some embodiments, the temporal noise corrected IR image 215 may be generated as:

$$\text{temporal noise corrected IR image pixel value}_{row\ x, column\ y, T_{n+1}} = \alpha * \text{temporal IR image average}_{row\ x, column\ y, T_n} - (1-\alpha) * \text{IR image}_{ParallaxTransform(row\ x, column\ y, REG\ Diff), T_{n+1}}$$
$$\Rightarrow \alpha * \text{temporal IR image average}_{row\ x, column\ y, T_n} + \text{IR image}_{ParallaxTransform(row\ x, column\ y, REG\ Diff), T_{n+1}} - \alpha * \text{IR image}_{ParallaxTransform(row\ x, column\ y, REG\ Diff), T_{n+1}} \quad \text{(equation 2)},$$

where (row x, column y) denotes a pair of pixel coordinates in an image, e.g. the temporal noise corrected IR image 215, ParallaxTransform is a predetermined coordinate transform function describing the mapping of pixel coordinates in the temporal IR image average to pixels in the IR image that represent the same part/object in the observed scene, $T_{index}$ denotes the temporal index of the image in the video sequence, and a denotes a weighting factor in the range [0-1].

In some embodiments, the IR image REG Img 272 is generated through shifting and rotating the captured IR image 261.

In some embodiments, pixel difference values 211 can be calculated based on the registered IR image REG Img 272 and the temporal IR image average.

In some embodiments, the ATF 210 is further configured to calculate pixel difference values 211 based on the temporal IR image average 2151 and the registered IR image REG Img 272.

In some embodiments, the pixel difference values 211 may be calculated as:

$$\text{pixel difference values}_{row\ x, column\ y, T_{n+1}} = \text{temporal IR image average}_{row\ x, column\ y, T_n} - \text{REG Img}_{row\ x, column\ y, T_{n+1}} \quad \text{(equation 3)},$$

where (row x, column y) denotes the pixel coordinates in an image, e.g. the temporal noise corrected IR image 215, and $T_{index}$ denotes the temporal index of the image in the video sequence.

In some embodiments where generating a registered IR image REG Img 272 comprises merging or associating data, pixel difference values 211 can be calculated based on the registered IR image REG Img 272 and the temporal IR image average 2151.

In some embodiments, the pixel difference values 211 may be generated as:

$$\text{pixel difference values}_{row\ x, column\ y, T_{n+1}} = \text{temporal IR image average}_{row\ x, column\ y, T_n} - \text{IR image}_{ParallaxTransform(row\ x, column\ y, REG\ Diff), T_{n+1}} \quad \text{(equation 4)},$$

where (row x, column y) denotes the pixel coordinates in an image, e.g. the IR image 261, ParallaxTransform is a predetermined coordinate transform function describing the mapping of pixel coordinates in the temporal IR image average to pixels in the IR image that represent the same part/object in the observed scene, and $T_{index}$ denotes the temporal index of the image in the video sequence.

The ATF 210 may maintain the temporal IR image average 2151 and update it after each captured IR image has been processed.

In some embodiments, an updated temporal IR image average 2151 may be calculated as:

$$\text{temporal IR image average}_{row\ x, column\ y, T_{n+1}} = \text{temporal noise corrected IR image pixel value}_{row\ x, column\ y, T_{n+1}} \quad \text{(equation 5)},$$

where (row x, column y) denotes the pixel coordinates in an image, e.g. the temporal IR image average, and $T_{index}$ denotes the temporal index of the image in the video sequence.

In an optional embodiment, a normalized form of the pixel difference values 211 is generated as pixel difference weights 213.

In some embodiments, the pixel difference weights 213 may comprise a normalized form of the pixel difference values 211 in the range of [0-1].

In some embodiments where generating a registered IR image REG Img 272 comprises shifting and rotating the captured IR image 261, pixel difference weights 213 can be generated based on the pixel difference values 211.

In some embodiments, the pixel difference weights 213 may be calculated as:

$$\text{pixel difference weight}_{row\ x, column\ y, T_{n+1}} = k_1 * e^{\frac{-\text{pixel difference value}_{row\ x, column\ y, T_{n+1}}}{k_2 * \sigma^2}} \quad \text{(equation 6)}$$

where (row x, column y) denotes a pair of pixel coordinates in an image, e.g. the temporal IR image average 2151, $T_{index}$ denotes the temporal index of the image in the video sequence, $K_1$ is a constant, e.g. equal to $$\frac{1}{\sqrt{2\pi\sigma^2}},$$

and K2 is a constant, e.g. equal to 2.

In a non-limiting example the difference weights are in the range [0-1].

Functional Block PAN

In some embodiments, the functional blocks may comprise a PAN-tilt functional block PAN 280. In some embodiments, the PAN 280 may be configured to: receive a register difference REG Diff 273; receive a temporal IR image average 2151; and send a temporal IR image average (e.g., a motion compensated temporal IR image average based on the temporal IR image average 2151 according to some embodiments) to an ATF 210.

To further reduce the computational complexity, the received temporal IR image average 2151 may be motion compensated or spatially aligned to the REG Img 272 such that pixel values in a common image part, i.e. the part representing the same subset of the scene or the same objects in the scene, have the same pixel coordinates in the motion compensated temporal IR image average as in the REG Img 272. This may be achieved e.g. by performing circular shift of rows and columns of the received temporal IR image average 2151 based on the register difference REG Diff 273, to generate a motion compensated temporal IR image average.

In some embodiments, the PAN 280 may further be configured to generate a motion compensated temporal IR image average.

In some embodiments, generating a motion compensated temporal IR image average may comprise performing circular shift of rows and columns of the received temporal IR image average 2151 based on the register difference REG Diff 273.

In some embodiments, generating a motion compensated temporal IR image average may comprise shifting, rotating and optionally cropping and/or zero filling the received temporal IR image average such that pixel values in a common image part, i.e. the part representing the same subset of the scene or the same objects in the scene, have the same pixel coordinates in the motion compensated temporal IR image average as in the registered IR image REG Img 272.

In some embodiments of the disclosure, an overlap measure may be determined, the overlap measure indicating the overlap of a first field of view of an IR image 261 captured at temporal index $T_{n+1}$, and a previous field of view of the previously captured IR image, e.g. captured at temporal index $T_n$.

In one or more embodiments, the PAN 280 may further be configured to: determine an overlap measure 282 based on the register difference REG Diff 273; and send the overlap measure to an evaluator unit 290.

In some embodiments, the overlap measure 282 may be determined for each pixel value of the registered IR image REG Img 272.

In some embodiments, each pixel value may have an associated pair of pixel coordinates, e.g. row and column coordinates, as would be understood by a skilled person.

In one non-limiting example, the determination of an overlap measure (e.g., overlap measure 282) may comprise setting the overlap measure to one (1) for pixel values in a common image part, i.e. the image part representing the same subset of the scene or the same objects in the scene, and setting the overlap measure to zero (0) for pixel values not in the common image part.

In one non-limiting example, determining the overlap measure comprises setting the overlap measure to TRUE for pixel values in a common image part, i.e. the image part representing the same subset of the scene or the same objects in the scene, and setting the overlap measure to FALSE for pixel values not in the common image part.

In some embodiments of the disclosure, a motion measure 283 may be determined, the motion measure 283 indicating the relative motion of a first field of view of the captured IR image 261 at $T_{n+1}$ and a previous field of view of a previously captured IR image, e.g. captured at temporal index $T_n$.

In one or more embodiments, the PAN 280 may further be configured to: determine a motion measure 283 based on the register difference REG Diff 273; and send the motion measure to an evaluator unit 290.

Functional Block EVAL

As previously mentioned, FPN relates mainly to deficiencies of the individual elements or pixels of the IR sensor/detector. The present disclosure relies on determining pixel difference values for the same part of the field of view captured by different detector/sensor elements or pixels of the IR sensor/detector. The different detector/sensor elements will indicate varying pixel difference values which can be used to determine the pixel values, e.g. offset, of the fixed pattern noise correction image. To further enhance the relevance of pixel difference values to the FPN correction image it may be determined that a part of the field of view is captured by different elements or pixels of the IR sensor/detector by determining a motion measure, in manners described herein. To further enhance the relevance of pixel difference values to the FPN correction image, it may be determined that a common part of the depicted field of view is captured in a common image part and simultaneously determining that the depicted field of views are not completely overlapping by determining an overlap measure, in manners described herein.

In some embodiments, the functional blocks may comprise an updating condition evaluator functional block EVAL 290. In one or more embodiments, the EVAL 290 may be configured to: receive pixel difference values 211 and corresponding pixel coordinates from the ATF 210; and evaluate the pixel difference values 211 in relation to an updating condition, wherein the updating condition at least includes a first updating condition 220 comprising determining (e.g., testing or checking) that a subset of the pixel difference values are below a pixel difference value threshold.

If the updating condition is successfully evaluated for at least one pixel difference value 211, the functional block EVAL 290 may further be configured to send the pixel difference values 211 for which the updating condition is successfully evaluated, and corresponding pixel coordinates, to a fixed pattern noise correction image updater FPN UPD 250.

In some embodiments, the pixel difference value threshold may be predetermined.

In some embodiments, the pixel difference value threshold may be dynamically adapted over time such that a high pixel difference value threshold is used initially and such that the pixel difference value threshold is reduced over time.

To further enhance the relevance of pixel difference values 211 to the FPN correction image 2153, the overlap of the REG image 272 and the temporal IR image average 2151 may be evaluated. As the FPN correction is dependent on the assumption that the FPN stays substantially the same when the captured field of view changes, a 100% overlap indicates that the captured field of view has not changed, and that no information relevant to the FPN correction image can be derived.

In one or more embodiments, the EVAL 290 may further be configured to receive an overlap measure 282, wherein the updating condition further comprises or includes a second updating condition 230 comprising determining (e.g., checking or testing) that the overlap measure is greater than a predetermined overlap threshold.

In some embodiments, the overlap measure 282 may be received for each pixel in the registered IR image REG Img 272, and the overlap measure may be evaluated for each pixel in the registered IR image REG Img 272.

In one example, an overlap measure may be determined by the PAN 280 for each pixel in the registered IR image REG Img 272 and sent to EVAL 290, and the updating condition may be evaluated, by EVAL 290, for each pixel in the registered IR image REG Img 272. The pixel coordinates for which the updating condition is fulfilled, i.e. for which the pixel difference value 211 is greater than zero (0), are sent to FPN UPD 250.

To further enhance the relevance of pixel difference values to the FPN correction image, the relative movement of an IR image 261 captured at temporal index $T_N$ and a previous IR image captured at temporal index $T_{N-1}$ may be evaluated. As the FPN correction is dependent on the assumption that the FPN stays substantially the same when the captured field of view changes but maintains a common overlapping part, a sufficiently small relative movement indicates that captured field of view has not changed so much that information relevant to the FPN correction image can be derived, i.e. there is no common overlapping part.

In some embodiments, the EVAL 290 is further configured to receive a motion measure 283, wherein the updating condition further comprises or includes a third updating condition 240 comprising determining that the motion measure is greater than a motion threshold.

In one or more embodiments, the third updating condition 240 may further comprise determining that the motion measure is less than a maximum motion threshold.

In one example, the motion measure value is greater than a maximum motion threshold value, and may consequently be considered as a transient or erroneous state. The pixel difference values should therefore not be used to update the fixed pattern noise image.

In some embodiments, the EVAL 290 may further be configured to receive a motion measure 283 and an overlap measure 282, wherein the updating condition further comprises determining that the overlap measure is greater than a predetermined overlap threshold and determining that the motion measure is greater than a predetermined motion threshold.

In some embodiments, the motion measure 283 is received for each pixel in the registered IR image REG Img 272, and the motion measure 283 is evaluated for each pixel in the registered IR image REG Img 272.

In a non-limiting example, the predetermined overlap threshold may be zero (0) and the predetermined motion threshold may be 5 pixels.

Functional Block FPN UPD

To improve and adapt the correction of FPN of captured IR images in the video sequence, the FPN correction image is updated when pixel difference values are evaluated as fulfilling an updating condition, or deemed relevant to the FPN correction image.

In one or more embodiments, the functional blocks may comprise a fixed pattern noise correction image updater functional block FPN UPD 250. In some embodiments, the FPN UPD 250 may be configured to: receive pixel difference values 211, for which the updating condition is successfully evaluated, and corresponding pixel coordinates; and update the FPN correction image 2153 based on the received pixel difference values 211 and corresponding pixel coordinates.

In some embodiments, the updating of the FPN correction image 2153 may comprise updating FPN correction image pixel values as:

FPN correction image$_{row\ x, column\ y, T_{n+1}}$ =FPN correction image$_{row\ x, column\ y, T_n}$+sign(pixel difference value$_{row\ x, column\ y, T_{n+1}}$) (equation 7).

The system embodiments described herein may be used in any suitable combination.

Method Embodiments

In some embodiments, the present disclosure provides a method for correcting fixed pattern noise that may involve maintaining a temporal IR image average 2151 in memory 115 and calculating pixel difference values 211 for each pixel of the IR image 261 based on the temporal IR image average 2151. The difference value of each pixel may indicate how the response or output signal of an element, in the IR sensor/detector 1132, depicting a specific object in the scene, differs from the average response or output signal depicting the same specific object represented by the temporal IR image average 2151. The pixel difference values 211 may then be used to determine if a fixed pattern noise correction image should be updated based on an evaluation of the calculated pixel difference values 211 in relation to an updating condition. If the updating condition is fulfilled, the fixed pattern noise correction image is updated based on the calculated pixel difference values.

In one or more embodiments there is provided a method for correcting fixed pattern noise of an infrared IR image 261 in a video sequence, the method comprising, calculating, by an adaptive temporal Filtering functional block ATF 210, pixel difference values 211 based on a temporal IR-image-average 2151 and the IR image of the sequence 261; evaluating, by an updating condition evaluator functional block EVAL 290, an updating condition based on the pixel difference values 211, wherein the updating condition at least comprises determining that a subset of the pixel difference values are below a predetermined pixel difference value threshold; updating, by a fixed pattern noise correction image updater functional block FPN UPD 250, a fixed pattern noise correction image if the updating condition is evaluated as fulfilled; correcting, by a fixed pattern noise correction functional block FPN CORR 260, fixed pattern noise of the infrared IR image based on the fixed pattern noise correction image.

Figure 4:
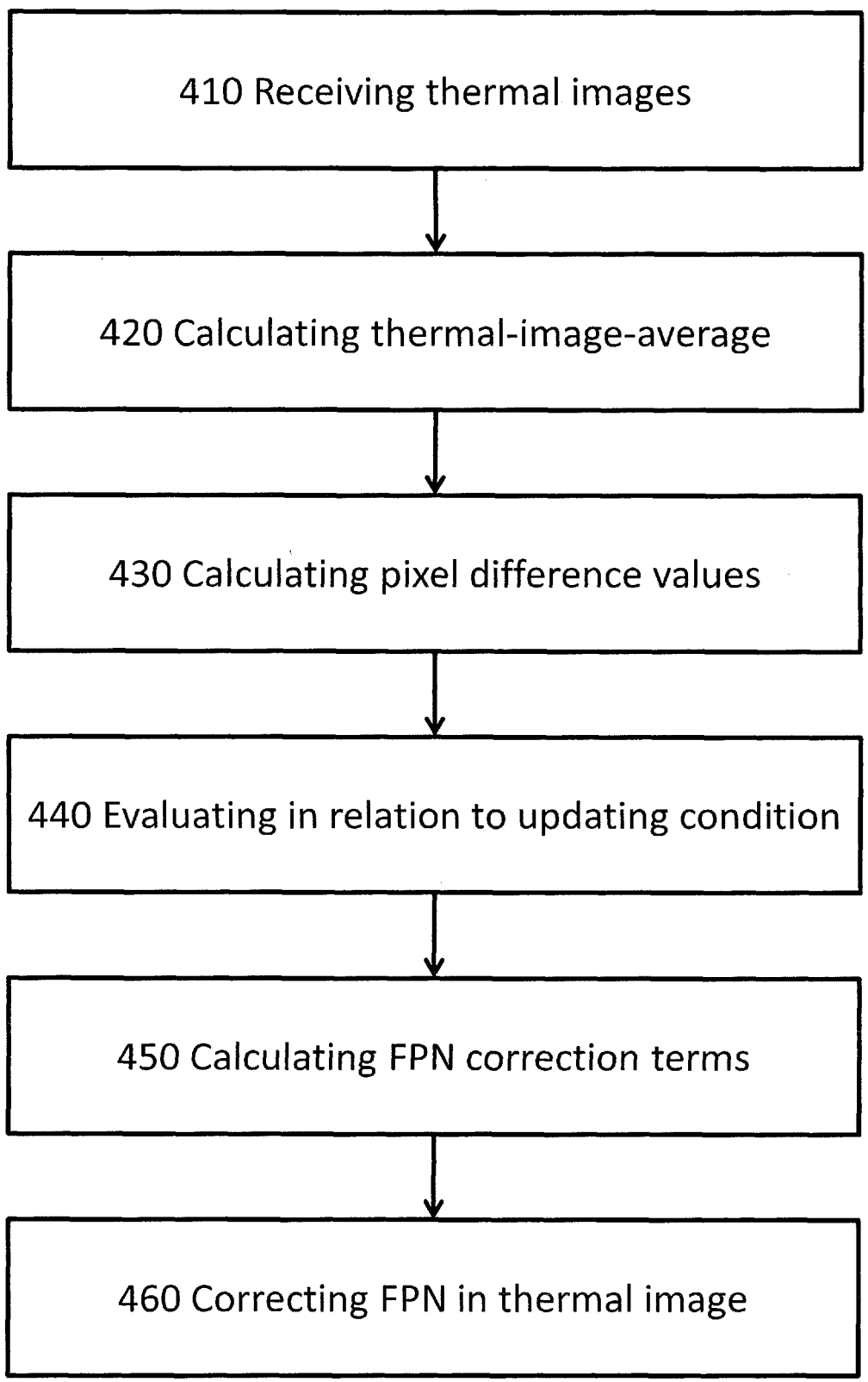
FIG. 4 shows a flowchart of a method for correcting fixed pattern noise (FPN) of an infrared (IR) image in a video sequence, according to one or more embodiments presented herein.

FIG. 4 shows a flowchart of one or more embodiments of a method of correcting fixed pattern noise in a video sequence of thermal images captured using a thermal imaging system, comprising:

Block 410: receiving a sequence of thermal images captured using a thermal imaging system;

Block 420: calculating a thermal-image-average of a plurality of the received thermal images;

Block 430: calculating pixel difference values between a received thermal image and the thermal-image-average;

Block 440: evaluating the pixel difference values in relation to an updating condition;

Block 450: calculating fixed pattern noise correction terms for the pixel difference values for which the updating condition is fulfilled; and Block 460: correcting pixel values of a subsequently received thermal image with the fixed pattern noise correction terms to generate a sequence of thermal images having corrected fixed pattern noise.

The updating condition may e.g. comprise that a subset of the pixel difference values 211 are below a predetermined pixel difference value threshold.

The correction of the pixel values of the subsequently received thermal image may involve generating and updating a fixed pattern noise correction image.

To further reduce the computational complexity, the temporal IR image average 2151 may be motion compensated or spatially aligned to the IR image 261 or a registered IR image REG Img 272 such that pixel values in a common image part, i.e. the part representing the same subset of the scene or the same objects in the scene, have the same pixel coordinates in the motion compensated temporal IR image average as in the REG Img 272. This may be achieved e.g. by performing a circular shift of rows and columns of the received temporal IR image average 2151 based on the register difference REG Diff 273 to generate a motion compensated temporal IR image average.

In some embodiments, the method further comprises to generate a motion compensated temporal IR image average.

Yet an advantage of motion compensating the temporal IR image average is that the time that the IR image average is valid and may be used to correct FPN can be extended.

In yet another embodiment, the IR image 261 is aligned to a reference image by generating a registered IR image REG Img 272 and a register difference REG Diff 273, e.g. aligning the IR image 261 captured at temporal index $T_N$ to a previously captured IR image with temporal index $T_{N-1}$ in the video sequence. In some embodiments, generating REG Img 272 comprises shifting, rotating and optionally cropping and/or zero filling the captured IR image 261 such that, after shifting, rotating and cropping of the IR image 261, each pixel with the same pixel coordinate in the reference image represents the same part/object in the observed scene. In one or more embodiments, generating REG Diff 273 may comprise generating a selection of parallax error values such as horizontal displacement, vertical displacement and rotation around the optical axis and a Parallax Transform relation. In one or more embodiments, generating a registered IR image REG Img 272 may comprise merging or associating data representing the captured IR image 261, data representing REG Diff 273 and a Parallax Transform relation as the registered IR image REG Img 272. Generating REG Diff 273 my further comprise generating a selection of parallax error values such as horizontal displacement, vertical displacement and rotation around the optical axis.

In some embodiments, the method further comprises generating a registered IR image REG Img 272 and a register difference REG Diff 273 based on a previously captured IR image in the video sequence.

The relevance of the pixel difference values to the FPN correction image may depend partially on the fact that two different elements in the sensor/detector 1132 represent the same specific object in the scene slightly different or provide a different output signal. Thus, if two successive IR images in the video sequence depict exactly the same part of the scene, or have the same depicted field of view, the specific object is depicted by the same element and no new information on FPN has been obtained. The present disclosure therefore determines whether a shift of the depicted field of view has occurred. To further enhance the relevance of pixel difference values to the FPN correction image, it may be determined that a common part of the depicted field of view is captured in a common image part, and simultaneously determined that the depicted fields of view are not completely overlapping by determining an overlap measure, in manners described herein.

In some embodiments, the method further comprising determining an overlap measure based on the register difference REG Diff 273, in order to determine that the overlap measure is greater than a predetermined overlap threshold.

In a non-limiting example, the determination of an overlap measure may comprise setting the overlap measure to one (1) for pixel values in a common image part, i.e. the image part representing the same subset of the scene or the same objects in the scene, and setting the overlap measure to zero (0) for pixel values not in the common image part.

In a non-limiting example, determining the overlap measure comprises setting the overlap measure to TRUE for pixel values in a common image part, i.e. the image part representing the same subset of the scene or the same objects in the scene, and setting the overlap measure to FALSE for pixel values not in the common image part.

To further enhance the relevance of pixel difference values to the FPN correction image, the relative movement of an IR image 261 captured at temporal index $T_N$ and a previous IR image captured at temporal index $T_{N-1}$, may be evaluated. As the FPN correction in the present disclosure may be dependent on the assumption that the FPN stays substantially the same when the captured field of view changes, but maintains a common overlapping part, a sufficiently small relative movement indicates that the captured field of view has not changed so that information relevant to the FPN correction image can be derived, i.e. there is a 100% overlapping part. Likewise, a sufficiently large relative movement indicates that the captured field of view has changed so that no information relevant to the FPN correction image can be derived, i.e. there is no overlapping part.

In some embodiments, the method further comprises determining a motion measure based on the register difference REG Diff 273, in order to determine that the motion measure is greater than a predetermined motion threshold.

In one example, the motion measure may be determined as value pairs of vertical and horizontal shift, with or without relative directional information. In yet an example, the motion measure is determined as the Euclidean distance between a first pixel value 5011 in a previously captured IR image in the video sequence, and a second pixel value 2611 in the IR image 261.

In some embodiments, the pixel difference values for which the updating condition is evaluated as fulfilled are used to update the FPN correction image 2153. Thus the updating results in an improved FPN correction of captured IR images. Yet an advantage of this is that computational complexity can be reduced, as only a subset of the pixel difference values for which the updating condition is evaluated as fulfilled, and the corresponding pixel coordinates in the IR image 261, are used to update the FPN correction image 2153.

In some embodiments, the method further comprises receiving pixel difference values 211, for which the updating condition is successfully evaluated, and corresponding pixel coordinates, and updating the FPN correction image 2153 based on the received pixel difference values 211 and corresponding pixel coordinates.

In some embodiments, the updating of the FPN correction image 2153 may update FPN correction image pixel values as:

$$\text{FPN correction image}_{row\ x, column\ y, T_{n+1}} = \text{FPN correction image}_{row\ x, column\ y, T_n} + \text{sign(pixel difference value}_{row\ x, column\ y, T_{n+1}})$$

Where sign( ) is a sign function or signum function that returns −1 for negative difference values less than zero, 0 for difference values=0 and 1 for positive difference values greater than zero, i.e.:

$$\text{sign}(X) := \begin{cases} -1 \text{ if } x < 0 \\ 0 \text{ if } x = 0 \\ 1 \text{ if } x > 0 \end{cases},$$

To reduce temporal noise, a temporal noise corrected IR image 215 is generated and output, e.g. to the communications interface 116, to the display 118 or to memory 115.

In some embodiments, the method further comprises generating a temporal noise corrected IR image 215.

To maintain the temporal IR image average, the temporal IR image average may be updated after an IR image 261 is captured and used to calculate a pixel difference value, e.g. as previously described in some embodiments herein.

In some embodiments, the method further comprises calculating and saving to memory 115 an updated temporal IR image average.

In some embodiments, an updated temporal IR image average 2151 may be calculated as:

$$\text{temporal IR image average}_{row\ x, column\ y, T_n+1} = \text{temporal noise corrected IR image pixel value}_{row\ x, column\ y, T_{n+1}}$$

as further described in relation to equation 5.

Figure 5:
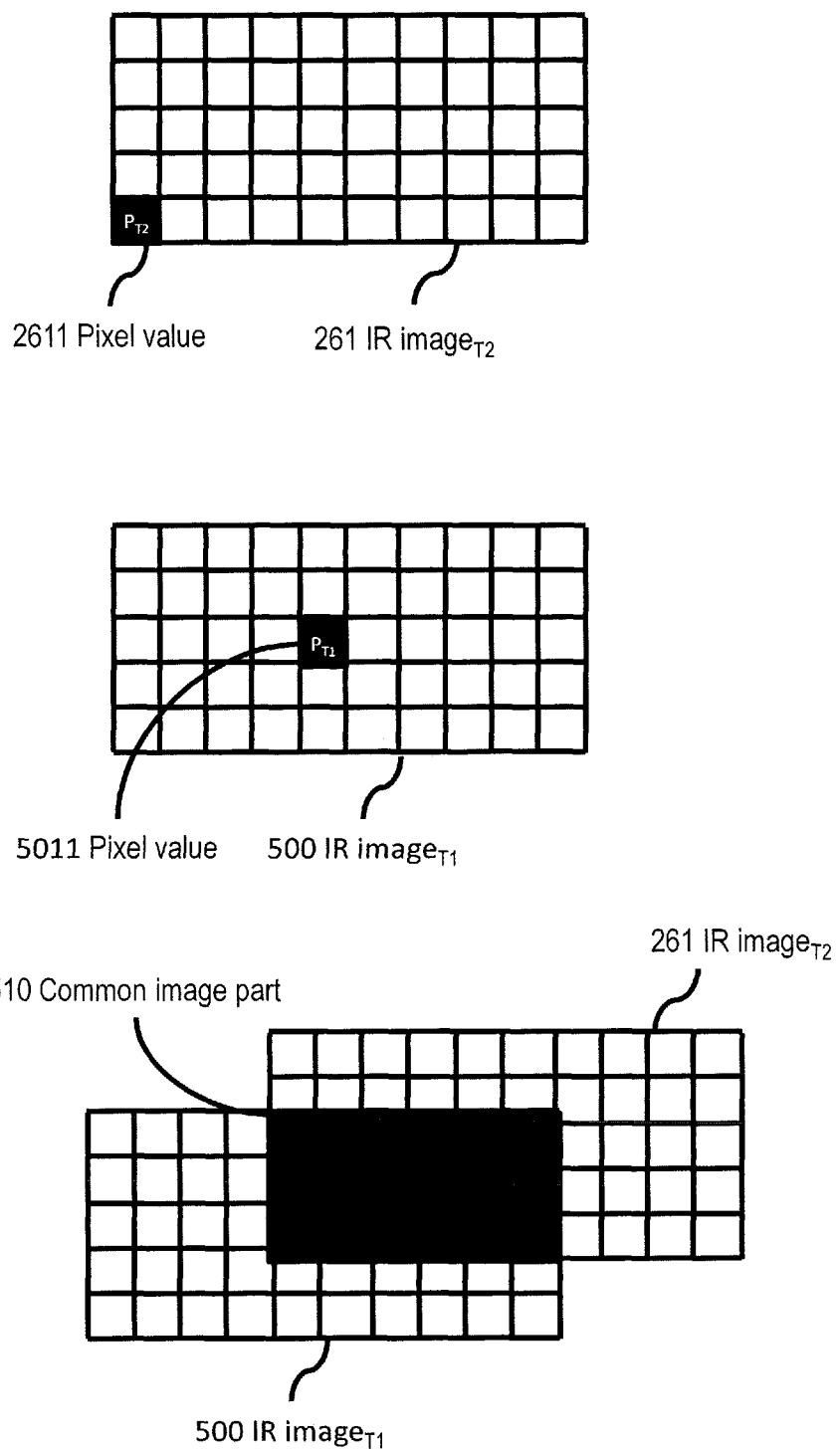
FIG. 5 shows a method for determining an overlap measure using two captured IR images, according to one or more embodiments presented herein.

FIG. 5 shows a method of determining an overlap measure using two captured IR images, according to one or more embodiments. In FIG. 5 two IR images 261, 500 with dimensions of 5 rows and 10 columns are shown for demonstrational purposes. Any dimension of the IR images including multiple pixels may be used. An IR image 261 that is captured at time or temporal index T2 of the video sequence, having a first field of view depicting a scene and dimensions 5×10, is obtained. A specific object in the scene is represented in the IR image 261 by a pixel value 2611, for illustrational purposes. An object may of course have any size and be represented by any number of pixels in any of the IR images. A previously captured IR image 500 was captured at time or temporal index T1 of the video sequence, having a previous field of view depicting a scene and dimensions 5×10, is obtained, e.g. from memory 115.

The specific object in the scene is represented in the previous IR image 500 by a pixel value 5011. The REG Diff 273 is received from function block REG 270, indicating that the parallax error Reg Diff 273 between IR image 261 and previous IR image 500 is a vertical shift of two (2) rows and a horizontal shift of four (4) columns. A common image part 510 may then be determined. The overlap measure value is then determined by setting it to one (1) (in the example of FIG. 5 shown as black) for pixel values in a common image part 510, i.e. the image part representing the same subset of the scene or the same objects in the scene, and determined setting it to zero (0) (in the example of FIG. 5 shown as white) for pixel values not in the common image part.

Figure 6:
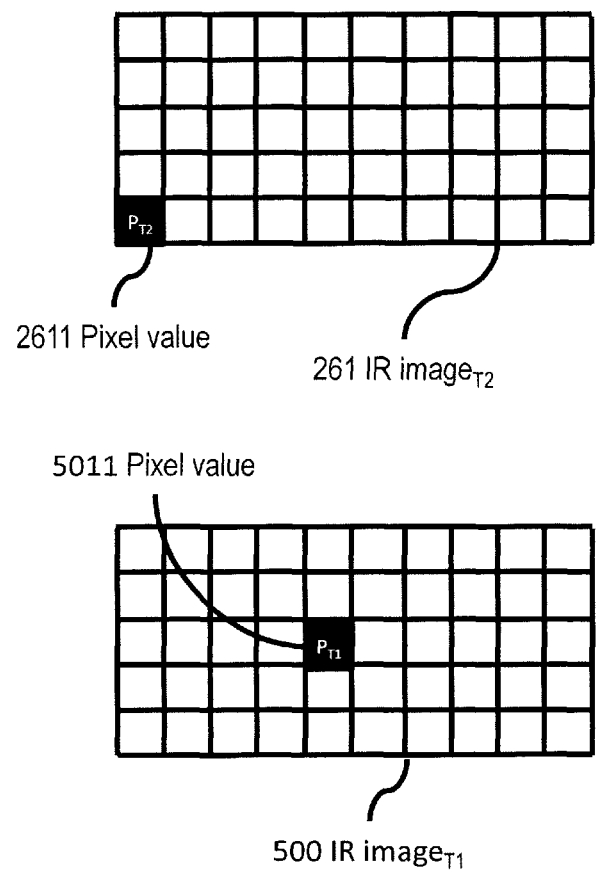
FIG. 6 shows a method for determining a motion measure using two captured IR images, according to one or more embodiments presented herein.

FIG. 6 shows a method for determining a motion measure using two captured IR images, according to one or more embodiments. In FIG. 6 an IR image with dimensions of 5 rows and 10 columns is shown for demonstrational purposes. Any dimension of the IR image including multiple pixels may be used. An IR image 261 captured at time or temporal index T2, having a field of view depicting a scene and dimensions 5×10, is obtained. A specific object in the scene is represented in the IR image 261 by a pixel value 2611, for illustrational purposes.

An object may of course have any size and be represented by any number of pixels in any of the IR images. A previously captured IR image 500 was captured at time or temporal index T1 of the video sequence, having a field of view depicting a scene and dimensions 5×10, is obtained, e.g. from memory 115. The specific object in the scene is represented in the previous IR image 500 by a pixel value 5011. The REG Diff 273 is received from function block REG 270, indicating that the parallax error Reg Diff 273 between IR image 261 and previous IR image 500 is a vertical shift of two (2) rows and a horizontal shift of four (4) columns. The motion measure 610 may then be determined as value pairs of vertical and horizontal shift, e.g. (2, −4) or without relative direction information (2,4). In another example the motion measure 610 may be determined as the Euclidean distance of 4,2 between the first pixel coordinate of pixel value 5011 and the second pixel coordinate of pixel value 2611.

Figure 7:
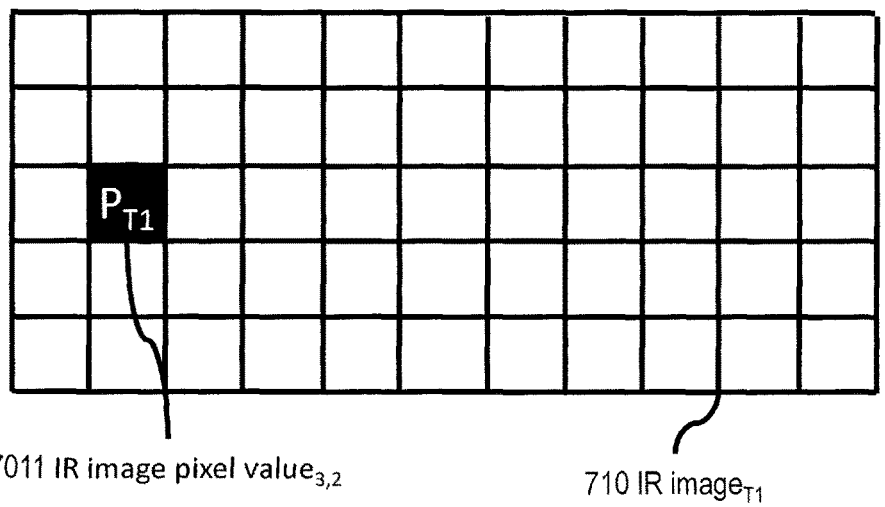
FIG. 7 shows a method for calculating an updated temporal IR image average using two captured IR images, according to one or more embodiments presented herein.
Figure 7:
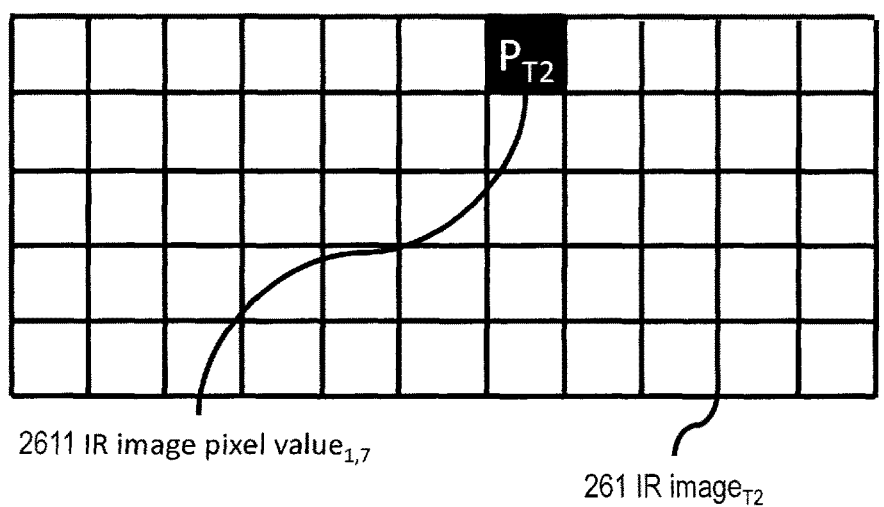
Figure 7:
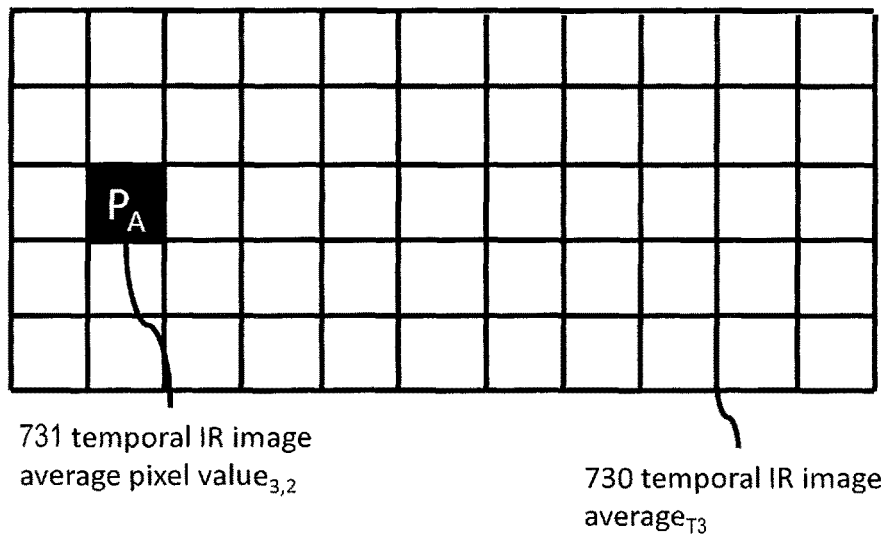

FIG. 7 shows a method for calculating an updated temporal IR image average using two captured IR images, according to one or more embodiments. In the example of FIG. 7, an initial IR image 710 in the video sequence is captured at time or temporal index T1, in addition to the IR image 261, the initial IR image 710 having a fourth field of view depicting a scene and dimensions 5×10. The same specific object in the scene is represented in the initial IR image by a pixel value 7011. An updated temporal IR image average pixel value is then calculated by combining the temporal IR image average pixel value 731 and the IR image pixel value 7011, as previously described in relation to equation 5.

In one example, the temporal IR image average is empty or has, before capturing the initial IR image 710, been reset. The pixel values of the initial IR image 710, including the initial IR image pixel value 7011, are then set as the initial temporal IR image average pixel values, e.g. initial IR image pixel value 7011, as temporal IR image average pixel value 731. The temporal IR image average 730 is then optionally saved to memory. An IR image 261 in a video sequence is captured at time or temporal index T2, having a first field of view depicting a scene and dimensions 5×10. The same specific object in the scene is represented in the IR image 261 by a T2 pixel value 2611. An updated temporal IR image average pixel value is then calculated by combining the temporal IR image average pixel value 731 and the IR image pixel value 2611, as previously described in relation to equation 5.

Aligning

Since the IR images in the video sequence are captured at different instances in time, the thermal imaging device might be moved in a way such that the offset, direction and rotation around the optical axis differ, e.g. between an IR image with temporal index $T_n$ and an IR image with temporal index $T_{n+1}$. This results in an optical phenomenon known as parallax error, comprising parallax distance error, parallax pointing error and parallax rotation error. Due to these parallax errors, the captured field of view of the observed scene might differ between IR images. In order to combine the IR image and the temporal IR image average to calculate pixel difference values, the images must be adapted so that at least a common image part represents the same part of the scene. This processing step is referred to as image registration or spatial alignment, i.e. the process of transforming different sets of data into one coordinate system through a coordinate transform. Registration or alignment may be performed according to any method known to a skilled person in the art, e.g. intensity-based, feature-based registration using linear or elastic transformations.

Further Embodiments

According to some embodiments, there is provided a computer-readable medium on which is stored non-transitory information configured to control a processor/processing unit to perform any of the steps or functions of the invention described herein.

According to some embodiments, there is provided a computer program product comprising code portions adapted to control a processor to perform any of the steps or functions of the invention described herein.

Software in accordance with the present disclosure, such as program code and/or data, can be stored in non-transitory form on one or more machine-readable mediums. It is also contemplated that software identified herein can be implemented using one or more general purpose or specific purpose computers and/or computer systems, networked and/or otherwise.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa. Where applicable, the ordering of various steps described herein can be changed, combined into composite steps, and/or separated into sub-steps to provide features described herein.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure. Accordingly, the scope of the invention is defined only by the claims.

The invention claimed is:

1. A method of correcting fixed pattern noise in a video sequence of thermal images captured using a thermal imaging system, comprising:
receiving a sequence of thermal images captured using the thermal imaging system;
calculating a thermal image average of a plurality of the received thermal images;
calculating pixel difference values between a first thermal image and the thermal image average;
evaluating the pixel difference values in relation to an updating condition, wherein the evaluation comprises determining whether an overlap measure between the first thermal image and a previously stored image is above a first overlap threshold and a motion measure between the first thermal image and the previously stored image is above a first motion threshold;
calculating fixed pattern noise correction terms for the pixel difference values for which the updating condition is fulfilled, wherein, for each of the pixel difference values for which the updating condition is fulfilled, the calculating the fixed pattern noise correction terms comprises adding a value to a respective previously stored fixed pattern noise correction term when the pixel difference value is positive and subtracting a value from a respective previously stored fixed pattern noise correction term when the pixel difference value is negative; and correcting pixel values of a subsequently received thermal image with the fixed pattern noise correction terms to generate a fixed pattern noise-corrected thermal image.

2. The method of claim 1, wherein the pixel difference values are calculated, based on adaptive temporal filtering, between pixels of a set of pixels of the first thermal image and pixels of a corresponding set of pixels of the thermal image average, the method further comprising:

generating pixel difference weights based on the pixel difference values and the adaptive temporal filtering, wherein:

the evaluation further comprises determining whether the pixel difference values are below a predetermined pixel difference value threshold based on the pixel difference weights, and the calculating the fixed pattern noise correction terms comprises updating previously stored fixed pattern noise correction terms associated with the pixel difference values for which the updating condition is fulfilled to obtain the calculated fixed pattern noise correction terms.

3. A method of correcting fixed pattern noise in a video sequence of thermal images captured using a thermal imaging system, comprising:

receiving a sequence of thermal images captured using the thermal imaging system;

calculating a thermal image average of a plurality of the received thermal images;

calculating pixel difference values between a first thermal image and the thermal image average;

evaluating the pixel difference values in relation to an updating condition, wherein the evaluation comprises determining whether an overlap measure between the first thermal image and a previously stored image is above a first overlap threshold and a motion measure between the first thermal image and the previously stored image is above a first motion threshold;

calculating fixed pattern noise correction terms for the pixel difference values for which the updating condition is fulfilled; and correcting pixel values of a subsequently received thermal image with the fixed pattern noise correction terms to generate a fixed pattern noise-corrected thermal image, wherein the thermal image average is calculated as one or more of a temporal and/or spatial image average, wherein, for each of the pixel difference values for which the updating condition is fulfilled, the calculating the fixed pattern noise correction terms comprises adding one to a respective previously stored fixed pattern noise correction term when the pixel difference value is positive and subtracting one from a respective previously stored fixed pattern noise correction term when the pixel difference value is negative.

4. The method of claim 1, wherein the evaluation of the pixel difference values in relation to the updating condition further comprises determining whether the pixel difference values are below a predetermined pixel difference value threshold, and wherein the predetermined pixel difference value threshold is adjustable.

5. The method of claim 1, wherein the evaluation of the pixel difference values in relation to the updating condition comprises determining whether the overlap measure is above the first overlap threshold and below a second overlap threshold and the motion measure is above the first motion threshold and below a second motion threshold.

6. The method of claim 1, wherein the evaluation of the pixel difference values in relation to the updating condition comprises determining one or more of the sign of the respective pixel difference values and/or the magnitude of the respective pixel difference values.

7. The method of claim 1, further comprising generating the first thermal image and a register difference by registering a received thermal image to the previously stored image, wherein the thermal image average is motion compensated based at least on the register difference.

8. The method of claim 1, further comprising correcting temporal noise in the subsequently received thermal image after the correcting of the pixel values of the subsequently received thermal image with the fixed pattern noise correction terms.

9. A non-transitory machine-readable medium on which is stored machine-readable code which, when executed by a processor of a thermal imaging device, causes the processor to perform the method of claim 1.

10. A thermal imaging device for correcting fixed pattern noise in a video sequence of thermal images, comprising a thermal imaging system, a memory, and a processor, wherein said processor is configured to:

receive a sequence of thermal images captured by the thermal imaging system;

calculate a thermal image average of a plurality of the received thermal images;

calculate pixel difference values between a first thermal image and the thermal image average that is stored in the memory;

evaluate the pixel difference values in relation to an updating condition, wherein the evaluation comprises determining whether an overlap measure between the first thermal image and a previously stored image is above a first overlap threshold and a motion measure between the first thermal image and the previously stored image is above a first motion threshold;

calculate fixed pattern noise correction terms for the pixel difference values for which the updating condition is fulfilled by, for each of the pixel difference values for which the updating condition is fulfilled, adding a value to a respective previously stored fixed pattern noise correction term when the pixel difference value is positive and subtracting a value from a respective previously stored fixed pattern noise correction term when the pixel difference value is negative; and correct pixel values of a subsequently received thermal image with the fixed pattern noise correction terms to generate a fixed pattern noise-corrected thermal image.

11. The device of claim 10, wherein the pixel difference values are calculated, based on adaptive temporal filtering, between pixels of a set of pixels of the first thermal image and pixels of a corresponding set of pixels of the thermal image average, wherein the processor is further configured to generate pixel difference weights based on the pixel difference values and the adaptive temporal filtering, wherein the evaluation further comprises determining whether the pixel difference values are below a predetermined pixel difference value threshold based on the pixel difference weights, and wherein the processor is configured to calculate the fixed pattern noise correction terms by updating previously stored fixed pattern noise correction terms associated with the pixel difference values for which the updating condition is fulfilled to obtain the calculated fixed pattern noise correction terms.

12. The device of claim 10, wherein the thermal image average is calculated as one or more of a temporal and/or spatial image average, and wherein the evaluation of the pixel difference values in relation to the updating condition further comprises determining whether the pixel difference values are below a predetermined pixel difference value threshold.

13. The device of claim 10, wherein the evaluation of the pixel difference values in relation to the updating condition comprises determining whether the overlap measure is above the first overlap threshold and below a second overlap threshold and the motion measure is above the first motion threshold and below a second motion threshold.

14. The device of claim 10, wherein the thermal image average is motion compensated, and wherein the evaluation of the pixel difference values in relation to the updating condition comprises determining one or more of the sign of the respective pixel difference values and/or the magnitude of the respective pixel difference values.

15. The method of claim 1, further comprising determining a common image part for the first thermal image and the previously stored image, wherein the determining whether the overlap measure is above the first overlap threshold is based on a number of pixel values in the common image part relative to a number of pixel values not in the common image part.

16. The method of claim 7, wherein the registering comprises determining parallax error values associated with horizontal displacement, vertical displacement, and/or rotation around an optical axis of the thermal imaging system.

17. The method of claim 1, further comprising generating the first thermal image and a register difference by registering a received thermal image to the previously stored image, wherein the register difference is based at least on horizontal displacement, vertical displacement, and/or rotation around an optical axis of the thermal imaging system, and wherein the overlap measure is based on the register difference.

18. The method of claim 1, wherein the calculating the fixed pattern noise correction terms comprises calculating the fixed pattern noise correction terms only for the pixel difference values for which the updating condition is fulfilled.

19. The method of claim 1, wherein the overlap measure is between a first field of view associated with the first thermal image and a second field of view associated with the previously stored image, and wherein the first field of view encompasses a first portion of a scene and the second field of view encompasses a second portion of the scene.

* * * * *